United States Patent [19]
Andrus et al.
[11] Patent Number: 4,555,297
[45] Date of Patent: Nov. 26, 1985

[54] FOIL APPLICATOR

[75] Inventors: Robert E. Andrus, San Antonio, Tex.; Steve Hampton, 1906 Elsworthy, San Antonio, Tex. 78248

[73] Assignee: Steve Hampton, San Antonio, Tex.

[21] Appl. No.: 613,333

[22] Filed: May 23, 1984

[51] Int. Cl.[4] .......... B29C 17/00
[52] U.S. Cl. .......... 156/461; 156/201; 156/464; 156/468; 156/475
[58] Field of Search .......... 156/461, 463, 464, 200-202, 156/475, 443, 538

[56] References Cited

U.S. PATENT DOCUMENTS

| | | | |
|---|---|---|---|
| 960,332 | 6/1910 | Jacobie | 156/464 X |
| 1,042,443 | 10/1912 | Jacobie | 156/464 |
| 4,115,180 | 9/1978 | Scalia | 156/201 X |
| 4,274,904 | 6/1981 | Harrison et al. | 156/475 X |

FOREIGN PATENT DOCUMENTS

| | | | |
|---|---|---|---|
| 755025 | 8/1956 | United Kingdom | 156/461 |

OTHER PUBLICATIONS

Glastar Foiler advertisement.
The Hargrave Foiler advertisement.
Diegel-Burnett, Inc. Foil-O-Matic advertisements.
Philly Foiler advertisement.
3 Photographs of Foiler sold more than one year prior to filing date.

*Primary Examiner*—David Simmons
*Attorney, Agent, or Firm*—Gunn, Lee & Jackson

[57] ABSTRACT

Apparatus and method for dispensing and applying copper foil to an edge and/or periphery of stained glass. The apparatus includes a horizontal base having a turntable, applicator platform, and dual adjustment applicator head mounted thereon. The applicator head includes a vertically adjustable foil support and a vertically adjustable guide bushing to permit the centered or uniformly offset application of the copper foil to the glass.

3 Claims, 8 Drawing Figures

FOIL APPLICATOR

BACKGROUND OF THE INVENTION

The present invention relates to apparatus for applying foil to the edges of stained glass.

The design of stained glass typically includes the uniform application of copper foil or other type of metal foil to the edge or periphery of the glass. In order to accomplish the desired application of the foil to the edge and/or peripheral surface of the glass, various types of foil dispensers or applicators have been developed. During the foiling process, the designer manually applies the adhesive side of the foil to the edge and/or periphery of the glass as the copper foil rolls off a spool or turntable and the paper backing on the foil is stripped therefrom.

Foil applicator devices have heretofore been subject to inherent limitations. For example, many foil applicator devices require the foil spool to be vertically mounted, thus requiring the designer to manually maintain the edge of the stained glass in a vertical, upright position in alignment with the foil spool. The design of such devices make it extremely difficult for the designer to keep the foil centered along the edge of the glass. Furthermore, prior foil applicators have not been designed to facilitate the offset of the foil a predetermined distance. Finally, foil applicator devices have heretofore been limited with respect to the size or width of foil for which they are adapted and typically require the spool to be replaced in order to accommodate different foil widths.

SUMMARY OF THE INVENTION

The present invention overcomes the limitations inherent in prior foil applicator devices by providing an apparatus which permits the horizontal application of copper foil to a portion of a glass plane. The invention apparatus includes a dual adjustment applicator head which permits the uniform centering or offset of the foil along the glass edge and/or peripheral surface and the accommodation of any foil width without the addition or removal of parts.

The preferred embodiment of the improved foil applicator comprises a horizontal base having a turntable and platform mounted thereon. The turntable is adapted to receive a roll of foil thereon and is rotably mounted to permit feeding or dispensation of the foil. The platform is fixedly mounted to the base and is adapted to receive an edge and/or periphery of the glass plane thereon.

The dual adjustment applicator head is mounted to the horizontal base in proximity to the applicator platform. The applicator head comprises a horizontal foil base or support having an internal thread in operative engagement with a vertical screw to permit vertical adjustment of the foil support relative to the platform. The applicator head also comprises a guide bushing having internal threads in operative engagement with an upstanding portion of the foil support to permit vertical adjustment of the guide bushing relative to the platform and the foil support.

A preferred method for applying copper foil utilizing the aforementioned apparatus comprises the steps of placing a portion of a glass plane atop the applicator platform, adjusting the foil support to permit the desired mounting of the foil relative to the edge and/or periphery of the glass plane, adjusting the guide bushing to accommodate the foil width, positioning the foil between the foil support and guide bushing, and positioning the edge and/or periphery of the glass, to which the foil is to be applied, in proximity to the foil support and the guide bushing. As the foil is dispensed from the turntable, the paper backing is stripped therefrom and the foil is manually applied to the edge and/or periphery of the glass.

DETAILED DESCRIPTION OF THE PREFERRED EMBODIMENT

Figure 1:
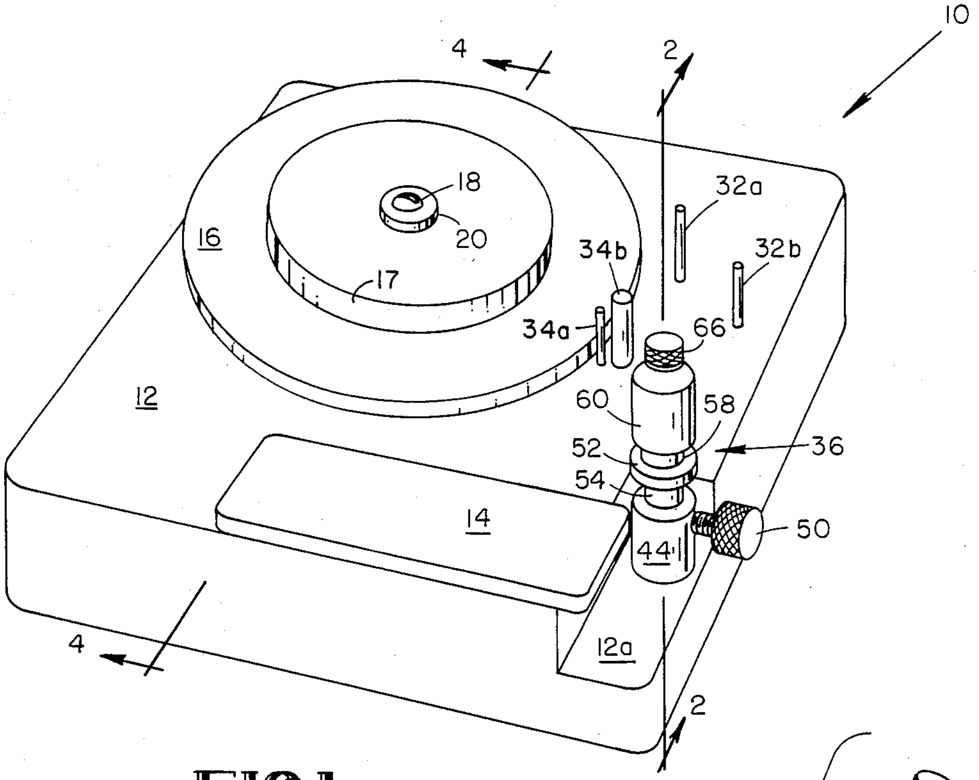
FIG. 1 is a perspective view of a preferred embodiment of an improved foil applicator.
Figure 4:
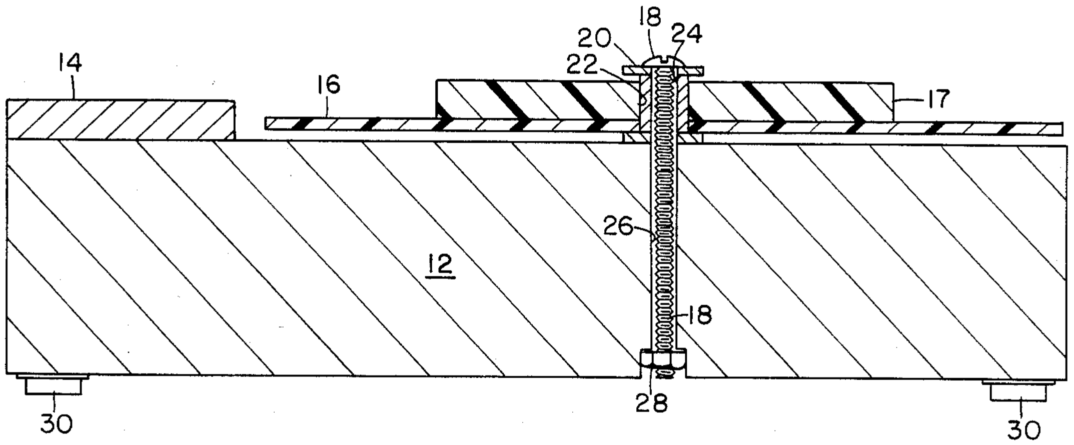
FIG. 4 is a cross sectional view of a preferred embodiment of an improved foil applicator taken along section lines 4—4 of FIG. 1.

The preferred embodiment of an improved foil applicator is identified in FIG. 1 by the number 10. The applicator 10 includes a horizontal base 12 having a platform 14 fixedly mounted to the top thereof. A circular turntable 16 having a raised boss 17 in the center thereof is rotatably mounted to the top of base 12 by means of a screw 18 and a spool 20. As illustrated in FIG. 4, spool 20 is received within a passage 22 through the center of boss 17 and turntable 16. Screw 18 extends through a passage 24 through spool 20 and a passage 26 through base 12 and is secured at the bottom of base 12 by a nut 28.

In the preferred embodiment, base 12 is preferably constructed of wood and platform 14 is preferably constructed of stainless steel. Furthermore, turntable 16 is preferably constructed of hard plastic and rests on the lowermost portion of spool 20, as illustrated in FIG. 4, to thereby rotate freely atop base 12. As further illustrated in FIG. 4, base 12 may be provided with a plurality of legs 30.

Referring again to FIG. 1, base 12 is provided with a pair of vertical, upstanding foil guides **32*a* and 32*b* which are mounted thereto in proximity to spool 16. Base 12 is also provided with a pair of vertical foil stripping pegs 34*a* and 34*b* which are mounted atop base 12 adjacent to spool 16. As further illustrated in FIG. 1, a dual adjustment applicator head 36 is mounted atop step or indentation 12*a* of base 12 in operative proximity to platform 14**.

Figure 2:
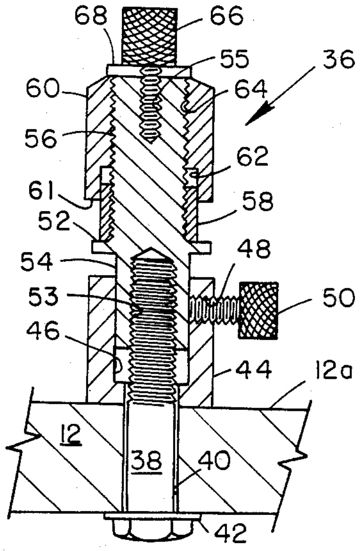
FIG. 2 is a cross-sectional view of a preferred embodiment of a dual adjustment applicator head taken along section lines 2—2 of FIG. 1.
Figure 3:
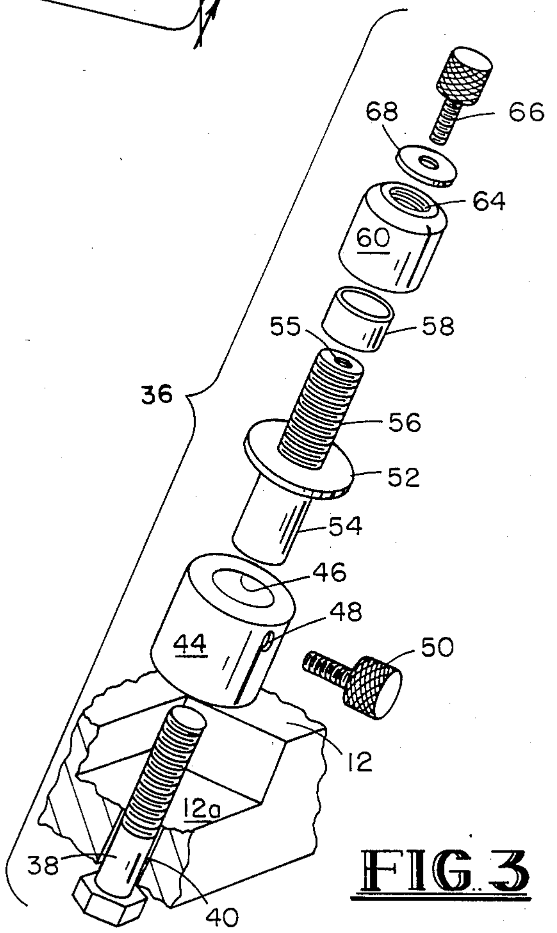
FIG. 3 is an exploded perspective view of a preferred embodiment of a dual adjustment applicator head.

Referring to FIG. 2 and FIG. 3, the dual adjustment applicator head 36 is illustrated in greater detail. A vertical, externally threaded bolt 38 extends upward through a passage 40 in step 12*a* of base 12. A washer 42 may also be provided at the head of bolt 38 beneath base 12, as illustrated in FIG. 2. A bushing 44 is glued or otherwise appropriately secured to step 12*a* about the uppermost, threaded portion of bolt 38. Bushing 44 has a first passage 46 within which to receive the threaded portion of bolt 38 and a second, internally threaded, passage 48 perpendicular to passage 46 within which to receive a bushing screw 50.

The applicator head 36 further comprises a foil support 52 having a first, downwardly extending, bushing 54 and a second, upwardly extending, externally threaded, bushing 56. In the preferred embodiment, bushings 54 and 56 form an integral part of foil support 52. As illustrated in FIG. 2, first foil support bushing 54 is adapted to be received within passage 46 of bushing 44. Bushing 54 has an internally threaded passage 53 within which to receive the threaded portion of bolt 38 in threaded engagement therewith. Externally threaded bushing 56 also has an internally threaded passage 55. Bushing 56 is further adapted to receive thereon a cylindrical strap or ring 58 which is preferably of leather construction.

As further illustrated in FIG. 2 and FIG. 3, the applicator head 36 also comprises a guide bushing 60 having a cavity 62 and an internally threaded passage 64 therethrough. As illustrated in FIG. 2, passage 64 is adapted to receive bushing 56 therein in threaded engagement with guide bushing 60 and cavity 62 is adapted to receive a portion of ring 58 therein. The applicator head 36 additionally comprises a guide bushing screw 66 adapted to be received within passage 55 in threaded engagement with bushing 56. A guide bushing washer 68 may also be provided.

Figure 5:
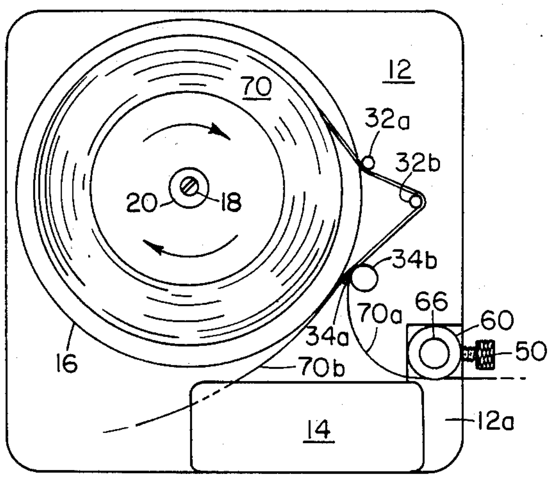
FIG. 5 is a top plan view illustrating foil dispensation from a preferred embodiment of an improved foil applicator.

Referring to FIG. 5, a preferred method for dispensing foil from the improved foil applicator 10 is shown. A roll of copper foil 70 or other desirable foil material is placed atop rotatable turntable 16. The turntable 16 is thereafter rotated, as illustrated by the arrows in FIG. 5, until the leading edge of the foil 70 is in proximity to foil guide pegs 32*a* and 32*b*. The leading edge of the copper foil 70 is thereafter wound about pegs 32*a* and 32*b*, as illustrated in FIG. 5.

It is to be understood that the copper foil 70 on turntable 16 will have a foil portion 70*a* with an adhesive side normally covered by protective paper 70*b* or another suitable material. The foil portion 70*a* and backing 70*b* on the leading edge of copper foil 70 must be separated manually with the foil portion 70*a* thereafter passed between foil stripper pegs 34*a* and 34*b*, as shown in FIG. 5. Stripper pegs 34*a* and 34*b* thereafter automatically achieve the desired stripping of the paper backing 70*b* from the copper foil 70*a* as the foil 70 rolls off turntable 16 during the application process.

Figure 6:
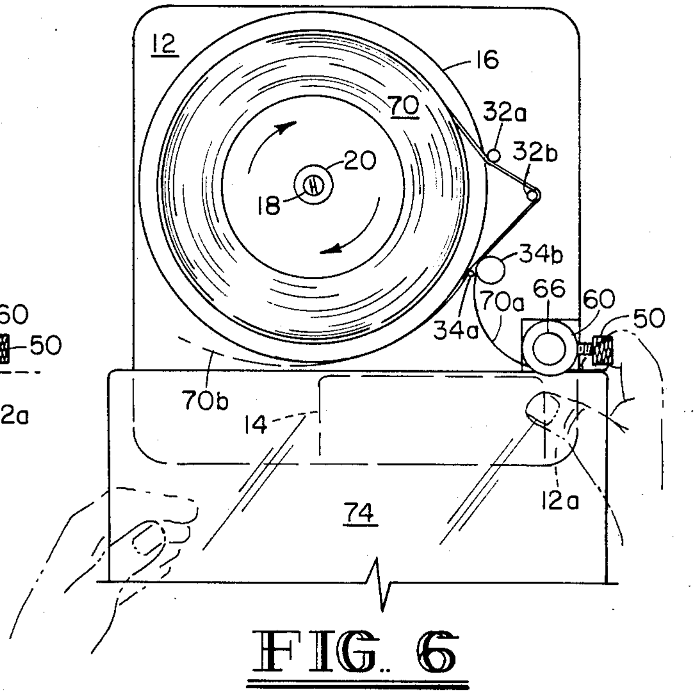
FIG. 6 is a top plan view illustrating a step in a preferred method for applying foil to an edge and/or the peripheral surface of a glass plane.
Figure 7:
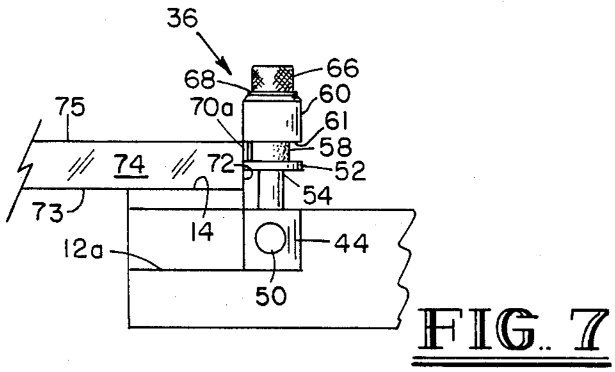
FIG. 7 is a partial plan view illustrating a step in a preferred method for applying foil to an edge of a glass plane.

As illustrated in FIG. 6 and FIG. 7, the stripped copper foil 70*a* will typically be applied to the edge 72 and/or the periphery of the lower surface 73 and/or upper surface 75 of a glass plane 74, such as a piece of stained glass. The glass 74 is initially placed atop platform 14 to permit edge 72 and/or the periphery of surfaces 73 and/or 75 to be in operative proximity with applicator head 36. The vertical height of foil support 52 is thereafter adjusted relative to platform 14 to permit the uniform and desired application of the copper foil 70*a* to edge 72 and/or the periphery of surfaces 73 and/or 75. For example, the vertical position of the foil support 52, as shown in FIG. 7, will permit and/or restrict the application of the copper foil 70*a* to the uppermost portion of edge 72. If the vertical height of foil support 52 is lowered below the uppermost surface of platform 14, applicator head 36 will permit the application of foil 70*a* to edge 72 and the periphery of surface 73. The vertical adjustment of foil support 52 is achieved by loosening bushing screw 50, rotating foil support 52, thereby resulting in vertical movement of foil support 52 relative to platform 14 due to the threaded engagement of bushing 54 with bolt 38, and retightening bushing screw 50 when support 52 has achieved the desired vertical height. It is to be understood that tightening screw 50 will exert pressure against first bushing 54 and thereby prohibit rotation and vertical movement of foil support 52. It is also to be understood that foil support 52 will move vertically upward upon rotation in a first direction and move vertically downward upon rotation in a second direction, opposite the first direction.

Prior to applying the copper foil 70*a* to edge 72 and/or the periphery of surfaces 73 and/or 75, the vertical height of guide bushing 60 relative to foil support 52 and platform 14 must also be adjusted. The desired vertical height of guide bushing 60 is determined by the width or vertical height of copper foil 70*a*, the portion of edge 72 to which foil 70*a* is to be applied, and/or the desired amount of copper foil 70*a* to overlay the periphery of the uppermost surface 75 of glass plane 74. The vertical height of guide bushing 60 is readily adjusted by loosening guide bushing screw 66, rotating guide bushing 60 in threaded engagement with bushing 56 until the desired vertical height is reached, and retightening guide bushing screw 66 in threaded engagement with bushing 56, thereby restricting further vertical movement of guide bushing 60. It is to be understood that guide bushing 60 will move vertically upward upon rotation in a first direction and move vertically downward upon rotation in a second direction, opposite the first direction.

Figure 8:
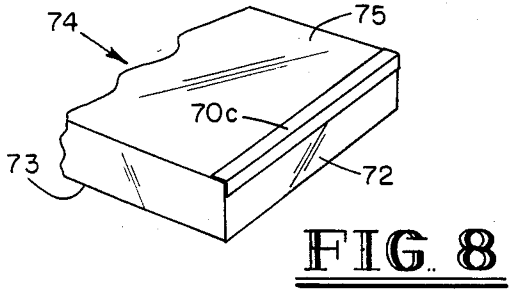
FIG. 8 is a partial perspective view of a glass plane having foil applied to a portion of the edge and peripheral surface thereof.

During the application of the copper foil 70*a* to the edge 72 and/or the periphery of surfaces 73 and/or 75 of glass 74, the copper foil 70*a* is continuously passed between the lowermost portion or shoulder 61 of guide bushing 60 and the uppermost portion of foil support 52, as shown in FIG. 7. At the same time, turntable 16 rotates, as shown by the arrows in FIG. 7, and continuously dispenses foil 70*a* to the applicator head 36. It is to be understood that the foil 70*a* will preferably have a vertical height or width approximately equivalent to the vertical distance between the uppermost portion of foil support 52 and the shoulder 61 of guide bushing 60. As the foil 70*a* is passed between foil support 52 and guide bushing 60, the adhesive side of copper foil 70*a* faces platform 14 and is manually secured or pressed against edge 72, lowermost surface 73, and/or uppermost surface 75, as illustrated in FIG. 6. At the conclusion of the application process, the glass plane 74 will have a copper foil edge or border 70*c* on all or a portion of edge 72 and/or along the periphery of glass surfaces 73 and/or 75, as illustrated in FIG. 8.

It is to be understood that the coordinated, vertical adjustment of guide bushing 60 and foil support 52 relative to platform 14 and each other will readily facilitate the desired and uniform application of foil 70*a* to a portion of glass 74. That is, dual adjustment applicator head 36 is able to accommodate any foil width in the range of 5/32" to ⅜" without the addition or removal of parts, can be fully adjusted to the exact foil width to compensate for manufacturers intolerances, and allows the foil to be centered or offset a predetermined amount regardless of the thickness of glass plane 74. Furthermore, horizontal platform 14 simplifies the application of foil to large and small pieces of glass 74. Finally, the layout of applicator head 36 readily facilitates the foiling of inside and outside curves which may be present on the edge or periphery of the glass 74.

It is also to be understood that throughout the application process the turntable 16 rotates and dispenses the copper foil 70 therefrom and that the paper backing **70*b* is stripped from the copper foil 70 and diverted from the work area in the vicinity of applicator head 36. Furthermore, turntable 16 readily accommodates a wide range of foil widths without the addition or removal of parts. Finally, leather ring 58 protects the foil 70*a* from the threads of bushing 56. Alternative methods for applying foil utilizing the applicator 10 will also be readily apparent to those skilled in the art. The rotable, horizontal turntable 16, dual adjustment applicator head 36**, and fixed, horizontal platform thus combine to simplify and permit the uniform, horizontal application of foil to an edge and/or peripheral surface of a glass article.

In the preferred embodiment, base 12 has a height of approximately one and one half inches (1½"), a width of approximately six and one quarter inches (6¼"), and a length of approximately seven and one eights inches (7⅛"). Turntable 16 preferably has a diameter of approximately five and one quarter inches (5¼") and platform 14 has a height of approximately one quarter inch (¼") above base 12. Finally, foil support 52 and guide bushing 60 preferably have a diameter of approximately three quarter inches (¾") and applicator head 36 is preferably constructed of stainless steel.

While the improved foil applicator and method for using same have been described in connection with the preferred embodiment, it is not intended to limit the invention to the particular forms set forth, but on the contrary, it is intended to cover such alternatives, modifications, and equivalents as may be included within the spirit and scope of the invention as defined by the appended claims.

We claim:

1. Apparatus for applying foil to a portion of a glass plane, comprising:
- a horizontal base;
- a turntable for receiving said foil thereon rotably mounted atop said base;
- a horizontal platform fixedly mounted atop said base adapted to receive said glass portion thereon; and
- a dual adjustment applicator head mounted to said base in operative proximity to said platform, comprising:
  - a foil support;
  - means for vertically adjusting said foil support relative to said platform, said means for vertically adjusting said foil support comprising a downwardly extending bushing integral with said foil support in threaded engagement with a threaded portion of an upstanding bolt;
  - a guide bushing; and
  - means for vertically adjusting said guide bushing relative to said platform and said foil support.

2. Apparatus for applying foil to a portion of a glass plane, comprising:
- a horizontal base;
- a turntable for receiving said foil thereon rotably mounted atop said base;
- a horizontal platform fixedly mounted atop said base adapted to receive said glass portion thereon; and
- a dual adjustment applicator head mounted to said base in operative proximity to said platform, comprising:
  - a foil support;
  - means for vertically adjusting said foil support relative to said platform;
  - a guide bushing; and
  - means for vertically adjusting said guide bushing relative to said platform and said foil support, said means for vertically adjusting said guide bushing comprising an upstanding bushing integral with said foil support in threaded engagement with said guide bushing.

3. Apparatus for applying foil to a portion of a glass plane, comprising:
- a horizontal base;
- a turntable for receiving said foil thereon rotably mounted atop said base;
- a plurality of pegs mounted atop said base for stripping backing from an adhesive portion of said foil;
- a horizontal platform fixedly mounted atop said base adapted to receive said glass portion thereon; and
- a dual adjustment applicator head mounted to said base in operative proximity to said platform, comprising:
  - a foil support;
  - a downwardly extending bushing integral with said foil support in threaded engagement with a threaded portion of an upstanding bolt extending through a passage in said base for vertically adjusting said foil support relative to said platform;
  - a guide bushing; and
  - an upstanding bushing integral with said foil support in threaded engagement with said guide bushing for vertically adjusting said guide bushing relative to said platform and said foil support.

* * * * *